United States Patent [19]

James et al.

[11] Patent Number: 5,052,541
[45] Date of Patent: Oct. 1, 1991

[54] SORTER FEEDER SYSTEM

[75] Inventors: Wayne R. James, Roswell, Ga.; Warren D. Neal, St. Clair; Suren A. Varjabedian, Warren, both of Mich.

[73] Assignee: Babcock Industries Inc., Fairfield, Conn.

[21] Appl. No.: 495,483

[22] Filed: Mar. 19, 1990

[51] Int. Cl.$^5$ .............................................. B65G 37/00
[52] U.S. Cl. .................................... 198/368; 198/370; 198/463.4; 198/464.3
[58] Field of Search ................... v/382, 412, 413, 416, v/463.3, 464.2, 817, 357, 394, 572, 464.3, 463.4, 370, 368; 271/236, 251

[56] References Cited

U.S. PATENT DOCUMENTS

| | | | |
|---|---|---|---|
| 2,753,976 | 7/1956 | Fitzmaurice | 198/382 |
| 3,303,916 | 2/1967 | Burt | 198/357 X |
| 3,508,604 | 4/1970 | De Good et al. | 198/412 X |
| 3,747,781 | 7/1973 | Daigle et al. | 198/463.3 |
| 3,823,811 | 7/1974 | Brockmuller | 198/382 |
| 4,245,734 | 1/1981 | Deutschländer et al. | 198/412 |
| 4,682,682 | 7/1987 | Hartlepp | 198/463.4 |
| 4,915,209 | 4/1990 | Canziani | 198/464.3 X |

FOREIGN PATENT DOCUMENTS

0305755  3/1989  European Pat. Off. ......... 198/464.2

Primary Examiner—Robert P. Olszewski
Assistant Examiner—Cheryl L. Gastineau
Attorney, Agent, or Firm—Barnes, Kisselle, Raisch, Choate, Whittemore & Hulbert

[57] ABSTRACT

A sorter feeder system for automatically singulating, orienting, accelerating and conveying an article in the form of commercial packages (boxes, cartons or crates of square or rectangular shape) onto a moving tray or slat sorter conveyor. The article is oriented such that its shortest dimension will be parallel to the direction of travel of the sorter conveyor. The system comprises an intermittently operated feeder conveyor which delivers articles to an elevated roller lift table having continuously running rollers which convey the article to a continuously running belt driven side guide which then acts in conjunction with the rollers to urge the article against a swing blade stop positioned at substantially right angle to the side guide. The article is then conveyed from the roller conveyor area to a tray on the sorter conveyor by simultaneously swinging the blade stop out of its interfering position and dropping the roller lift table such that said article is now in contact with a continuously running multistrand induction belt conveyor extending to the sorter conveyor. The velocity of the induction belts and the timing of the deposit of the article on the belts are synchronized with an empty tray signal positioned on the continuously running sorter conveyor, so that the article is delivered to a designate tray, and in a predetermined orientation.

23 Claims, 13 Drawing Sheets

SORTER FEEDER SYSTEM

This invention relates to sorter feeder systems.

BACKGROUND AND SUMMARY OF THE INVENTION

It has heretofore been common to provide sorter feeder systems which comprise a tray or slat sorter conveyor. Typical examples of such systems are shown in U.S. Pat. Nos. 2,753,976, 3,823,811 and 4,245,734 and UK patent application GB 2145387A. In the aforementioned UK patent application, a feeder conveyor directs manually pre-oriented articles against a V-shaped stop so that the articles are temporarily stopped and centered. Thereafter the stop is retracted and the article is delivered to the sorter conveyor.

Among the objectives of the present invention are to provide a sorter feeder system which will automatically—i.e. without human assistance or intervention—singulate, orient, accelerate and convey an article onto a sorter conveyor for the purpose of maximizing the volume of articles conveyed and reducing the speed of the sorter conveyor and induction conveyor.

In accordance with the invention, a sorter feeder system for conveying an article onto a moving tray or slat sorter conveyor comprises a feeder belt conveyor intermittently operable to deliver articles singularly to a roller lift table. The articles must be delivered singulated, however, the articles do not have to be on only one side of the feeder belt, as if skewed into position. The angularity of the table rollers carry and urge the article against a continuously running belt side guide toward a swing blade stop, all of which causes said article to assume a preferred orientation. The roller lift table is then lowered and the stop gate swings clear, so that the article engages a continuously operating multistrand induction belt conveyor positioned at an angle to the sorter conveyor. The induction belt conveyor accelerates and conveys the article in the predetermined orientation onto a designated tray of the sorter conveyor. By aligning the shortest dimension of the largest carried article with the direction of motion of the tray sorter, and by using multiple units of the present invention, the maximum volume of articles per tray sorter is achieved. Position sensors such as photo-electric sensors, limit switches, proximity switches, and the like, are used to sense the position of the article and activate the various mechanical motions via microprocessor controlled electropneumatic control means.

DESCRIPTION

Figure 1:
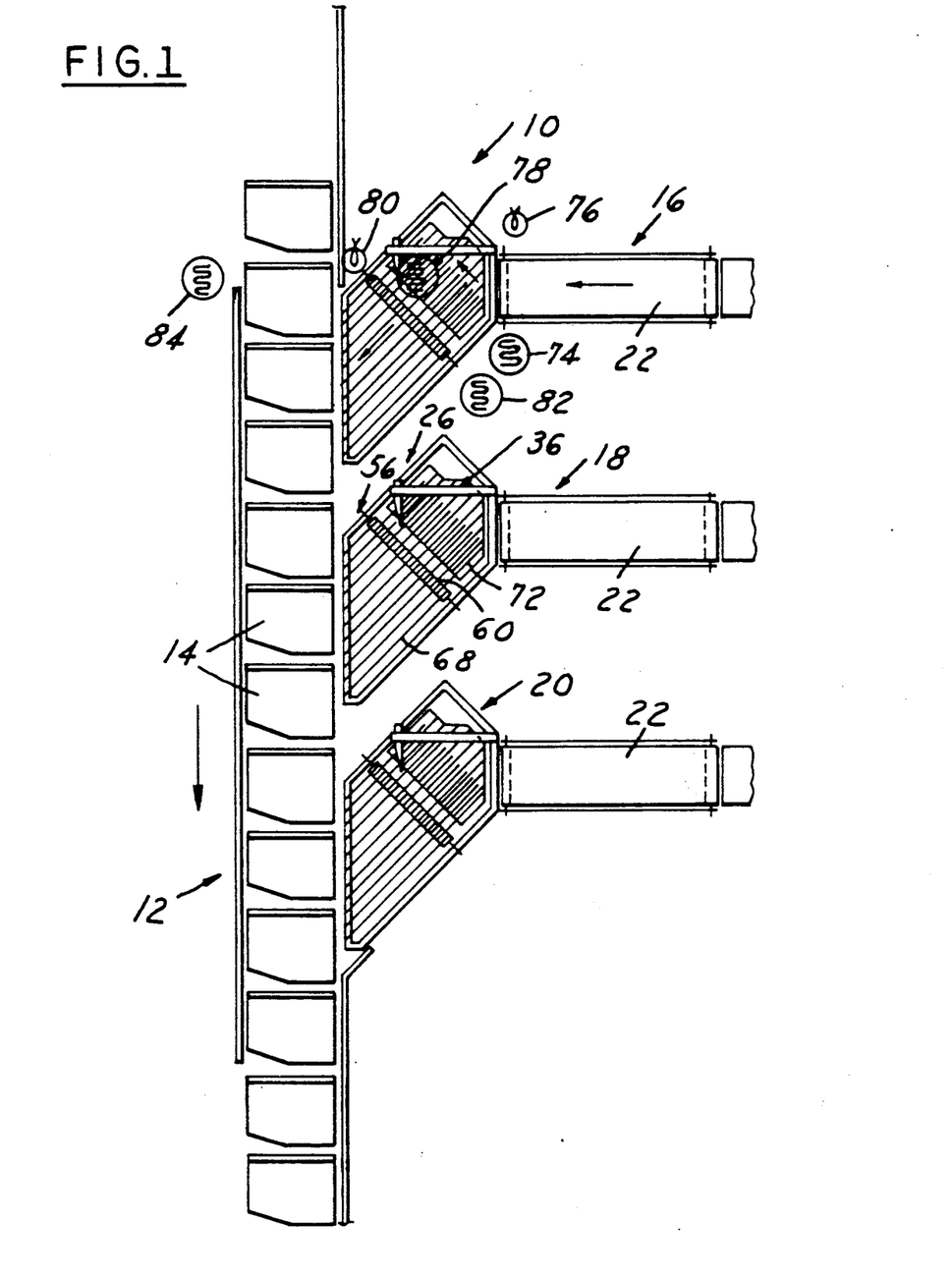
FIG. 1 is a partly diagrammatic view of a sorter feeder system embodying the invention.

The drawings illustrate a presently preferred embodiment of a sorter feeder system 10 (FIG. 1) in accordance with the invention as comprising a sorter conveyor 12, preferably a continuously moving conveyor having a plurality of trays 14 spaced from each other longitudinally of the direction of motion and defining positions for receiving articles to be conveyed at predetermined desired orientation. Conveyor 12 may be either of the tilting-tray type or the slat-conveyor type, both of which are generally conventional in the art. A plurality of feed systems, herein shown as three feed systems 16, 18 and 20 are spaced from each longitudinally of the direction of motion of conveyor 12 for feeding articles thereto intermittently and at desired orientation as a function of tray position. Feed system 16 will be described in greater detail in conjunction with the drawings, it being understood that systems 18 and 20 are identical to system 16.

Figure 8:
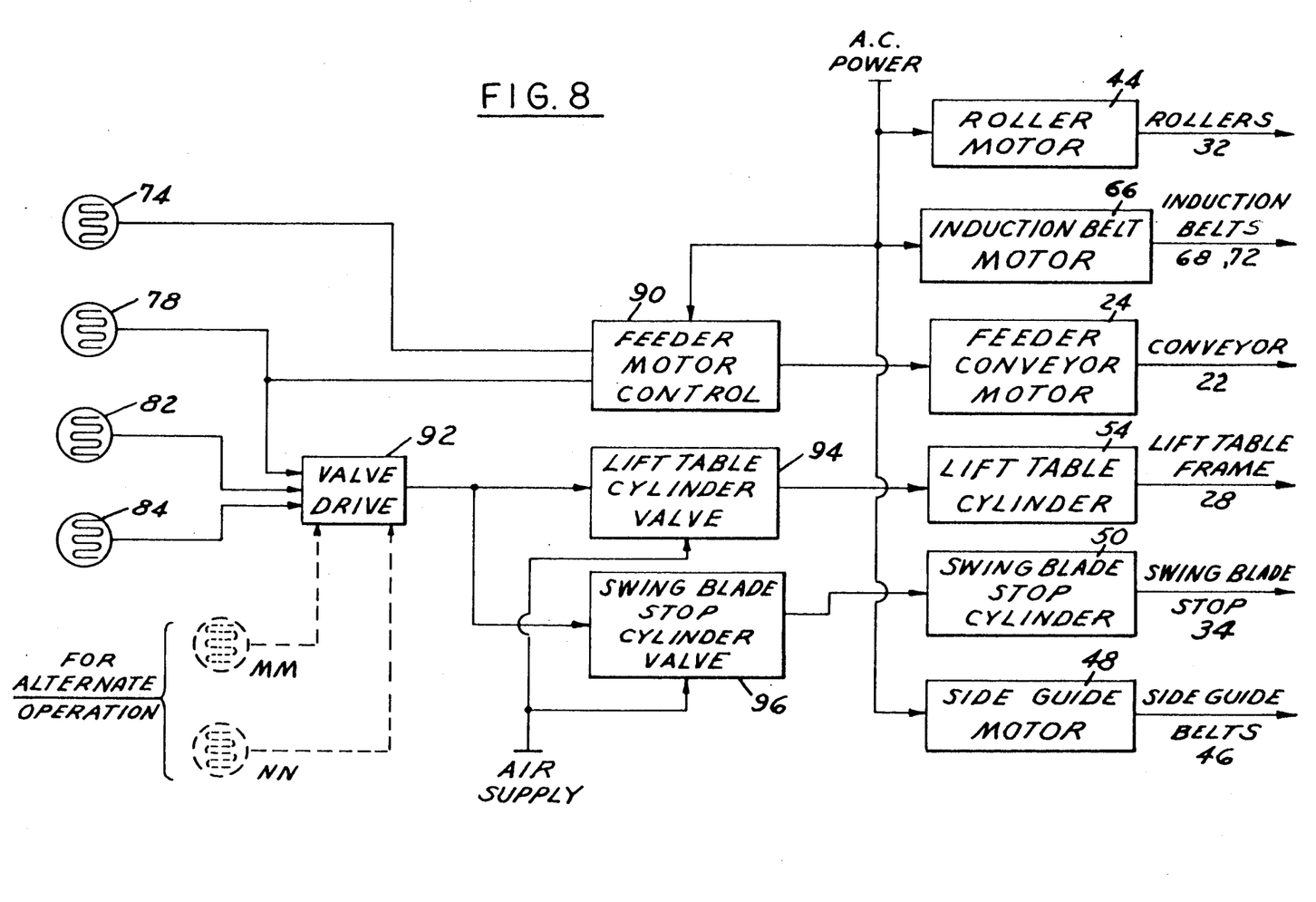
FIG. 8 is a functional block diagram of the electropneumatic control for the system of the present invention. Also depicts electronic controls for operating the invention whereby the difference between large and small article is detected, to provide an alternate method of control for the system.

Feed system 16 includes a feeder conveyor 22, such as a belt-type conveyor, coupled to an intermittently operated feeder conveyor motor 24 (FIG. 8). An orientation station generally indicated at 26 (FIG. 2) is positioned between feeder conveyor 22 and sorter conveyor 12 for receiving articles from conveyor 22 and orienting such articles in the select desired predetermined orientation for placement on conveyor 12. Specifically, orientation station 26 includes a generally rectangular frame 28 having upstanding stanchions 30 supporting a multiplicity of rollers 32 at equally spaced parallel and coplanar axes of rotation.

Feeder conveyor 22 is oriented in a direction to convey articles in a path generally perpendicular to the direction of the sorter conveyor 12. The orientation station 26 has its rollers 32 positioned to direct the articles at an acute angle to the direction of movement of the feeder conveyor 22. A movable swing blade stop 34 is positioned in overlying relation to the rollers 32 so that it normally is generally perpendicular to the feeder conveyor 22. A belt driven side guide 36 extends parallel to feeder conveyor 22 at a substantially right angle to the normal position of the blade stop 34. Rollers 32 are driven by a belt 38 engaging the surface of said rollers 32 by a system of pulleys 40, 42 coupled to a continuously operable motor 44 (FIG. 8). It will be noted in FIGS. 1 and 2 that the parallel axes of rotation of rollers 32 are at an angle, preferably 45°, to the direction of article feed from conveyor 22. The belts 46 of side guide 36 are driven by a continuously operable motor 48 and are arranged in a vertical array to constitute a moving face on the guide 36. Motor 44 drives rollers 32 in a direction so as to urge articles toward station 26. Motor 48 drives the belts 46 of the side guide 36 in a direction so as to urge the article towards station 26. Swing blade stop 34 is moved by a pneumatic cylinder 50 and is positioned so that its vertical face forms the downstream side of station 26. Rollers 32 urge the article against both the side guide 36 and swing blade stop 30. Thus, rollers 32, belt driven side guide 36 and swing blade stop 34 cooperate with each other to orient the articles at predetermined orientation with respect to the direction of feed from conveyor 22. For rectangular articles as illustrated in phantom in FIG. 2, swing blade stop 34 and belt driven side guide 36 are at orthogonal orientation to one another. Frame 28 is supported above the workplace floor by a system of linkages attached to a pneumatic cylinder 54 (FIG. 8) and also to shock absorber block 132 to cushion the high velocity of the vertically moving frame members, as presently described.

It has been found that the angle which the blade stop 34 makes with the side guide 36 is preferably slightly less than 90° such that blade stop 34 directs the article toward the side guide 36 and the blade stop absorbs impact of the articles.

The system also preferably includes anti-tipping skids 95 adjacent the leading end of conveyor 56. These skids function to engage the article and prevent tipping of the article rearwardly when the rollers 32 are lowered. This tendency to tip an article occurs when accelerating an article which is top heavy.

Figure 2:
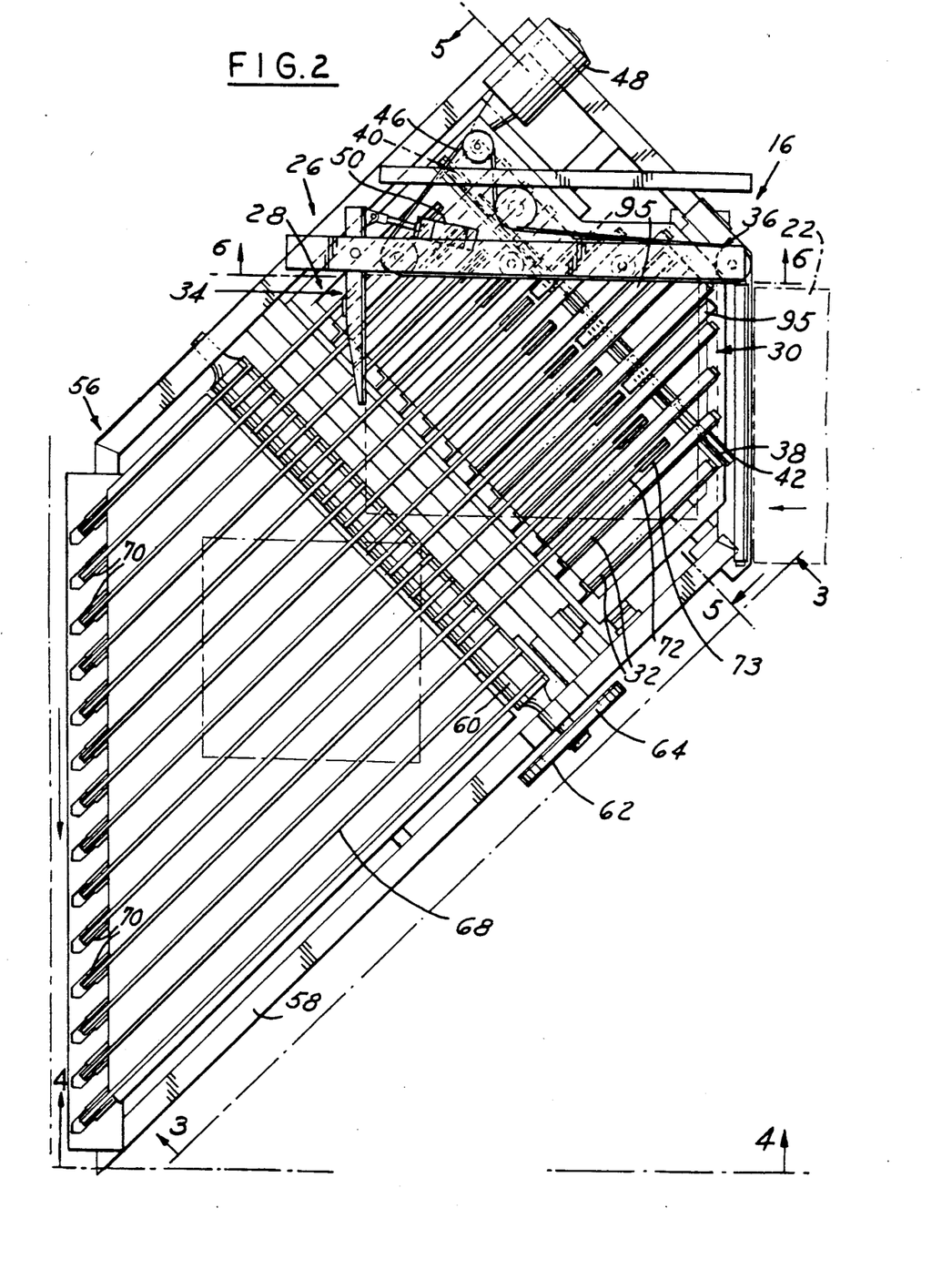
FIG. 2 is a plan view on an enlarged scale of a portion of the system shown in FIG. 1.
Figure 3:
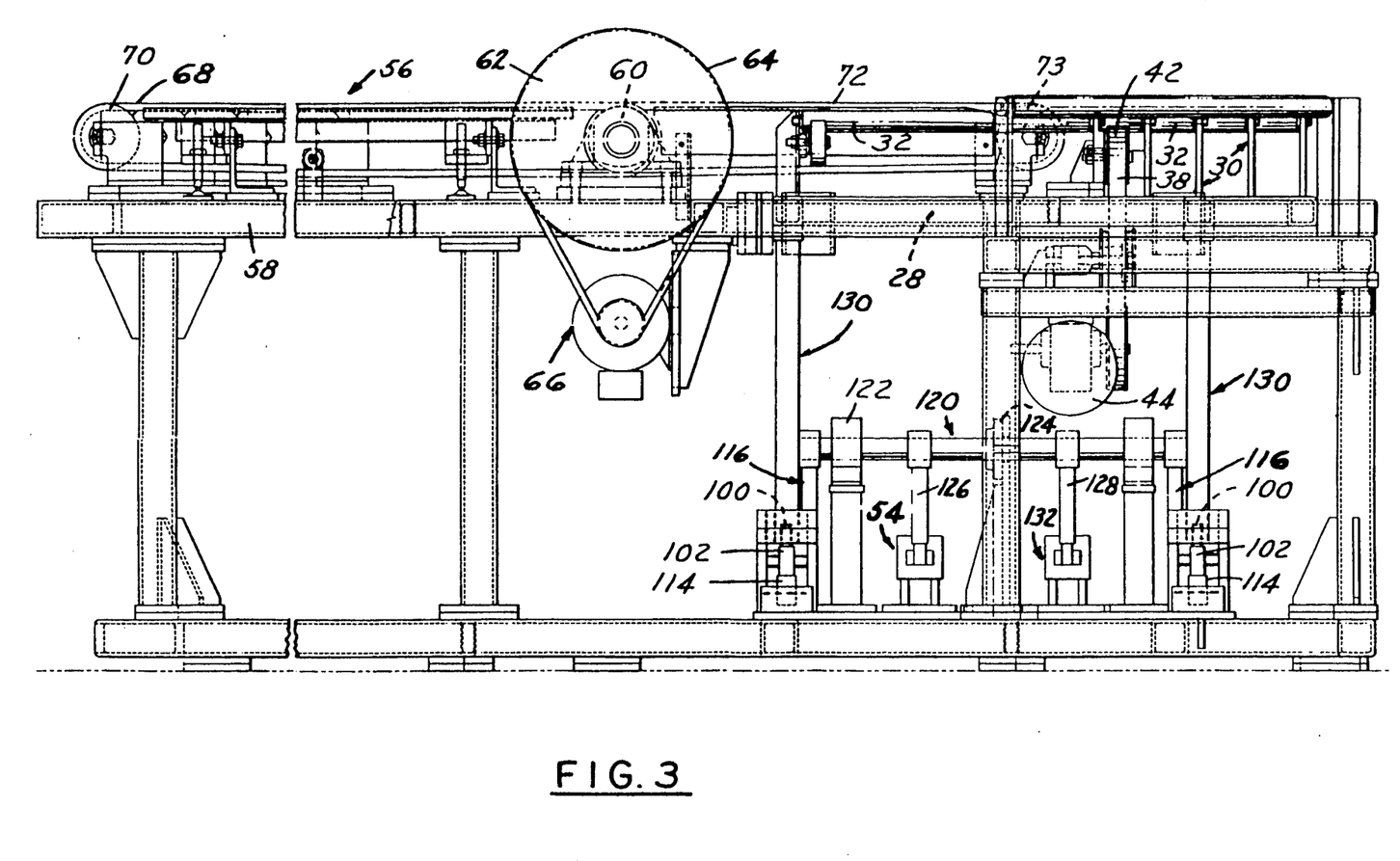
FIG. 3 is a side elevational view of the portion of the system taken along the line 3—3 in FIG. 2.

An induction conveyor 56 extends from orientation station 26 to sorter conveyor 12. Induction conveyor 56 comprises a fixed frame 58 which supports a central drive roller 60 coupled by the pulley 62 and a drive belt 64 to a continuously operable drive motor 66 (FIG. 3). A multiplicity of drive belts 68 extend from drive roller 60 around pulleys 70 adjacent to conveyor 12. A second multiplicity of drive belts 72 extend from drive roller 60 rearwardly around pulleys 73. Belts 68, 72 are staggered laterally of conveyor 56, as best seen in FIG. 2. Moreover, each pair of adjacent belts 72 are spaced laterally from each other by uniform separations which permit entry and free rotation of a roller 32 and supporting stanchions 30 therebetween. Drive belts 68, 72 are parallel to the axes of rotation of rollers 32. The upper planar article-support surface formed by rollers 32 is normally positioned above the planar support surface of belts 68, 72 in the upper position of orientation frame assembly 28 illustrated in FIG. 4, but is below the planar support surface of belt 68, 72 in the lowered position of frame 28 (FIG. 3). Conveyors 56 and 12 have substantially identical velocities in the direction of motion of conveyor 12.

Article detection means are positioned at preselected locations for coordinating operation of the invention. Such presence detection means are illustrated as photocells in the drawings. Specifically, a first photocell 74 is positioned with respect to a lamp 76 so as to detect presence of an article at the forward end of feeder conveyor 22. A second photocell 78 is positioned so as to detect presence of an article in station 26 in abutting engagement with swing blade stop 34. A third photocell 82 is positioned with respect to a lamp 80 so as to detect passage of an article from orientation station 26 along induction conveyor 56, and a fourth photocell 84 is located at a preselected position so as to detect an empty location on conveyor 12. Turning to FIG. 8, photocells 74 and 78 are coupled to a feeder motor control 90 for selectively connecting power to feed conveyor motor 24. Photocells 78, 80 and 84 are connected to valve drive electronics 92 for providing valve drive signals to a solenoid valve 94 coupled to cylinder 54, and solenoid valve 96 coupled to cylinder 50.

Figure 5:
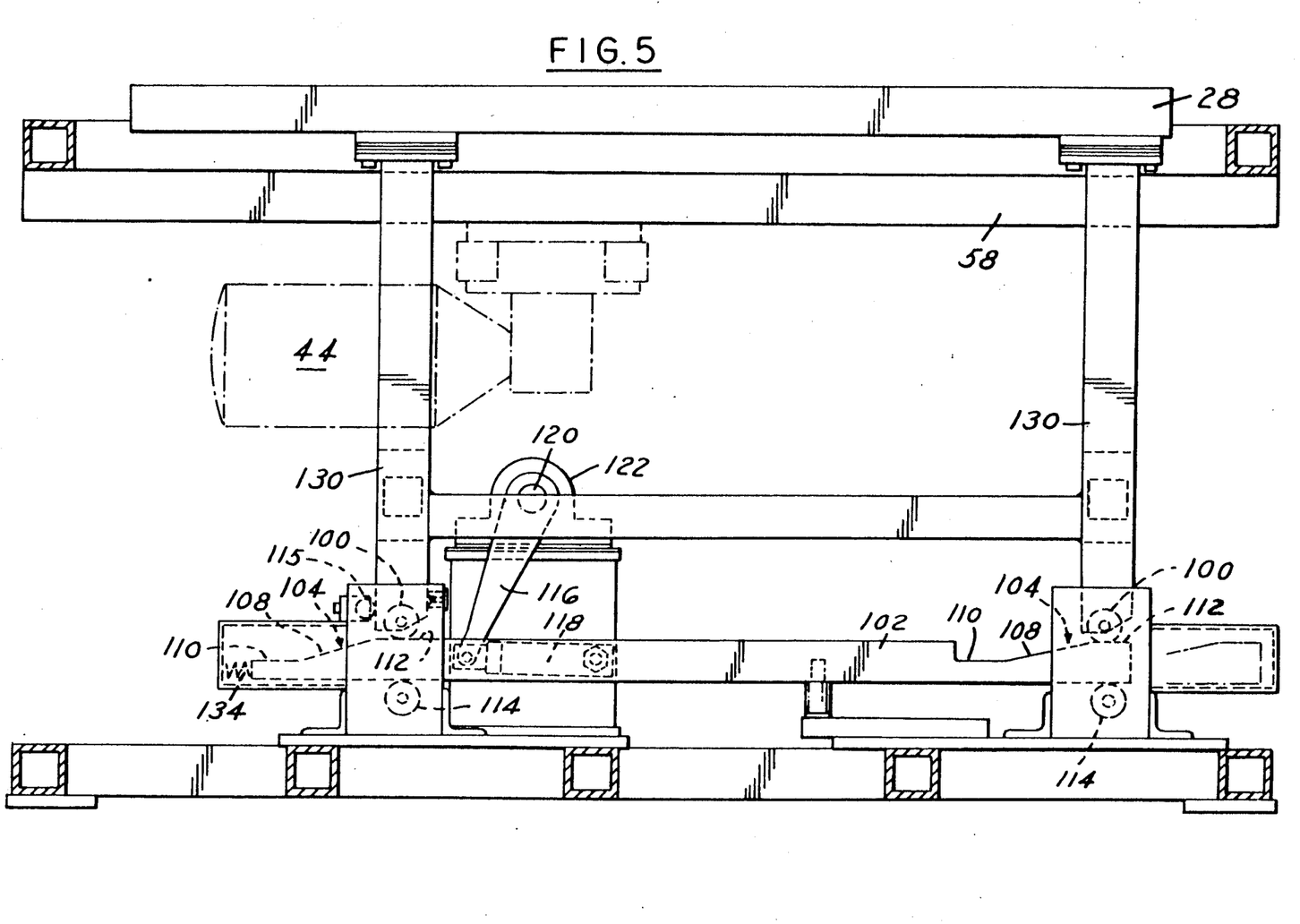
FIG. 5 is a fragmentary sectional view taken along the line 5—5 in FIG. 2.
Figure 6:
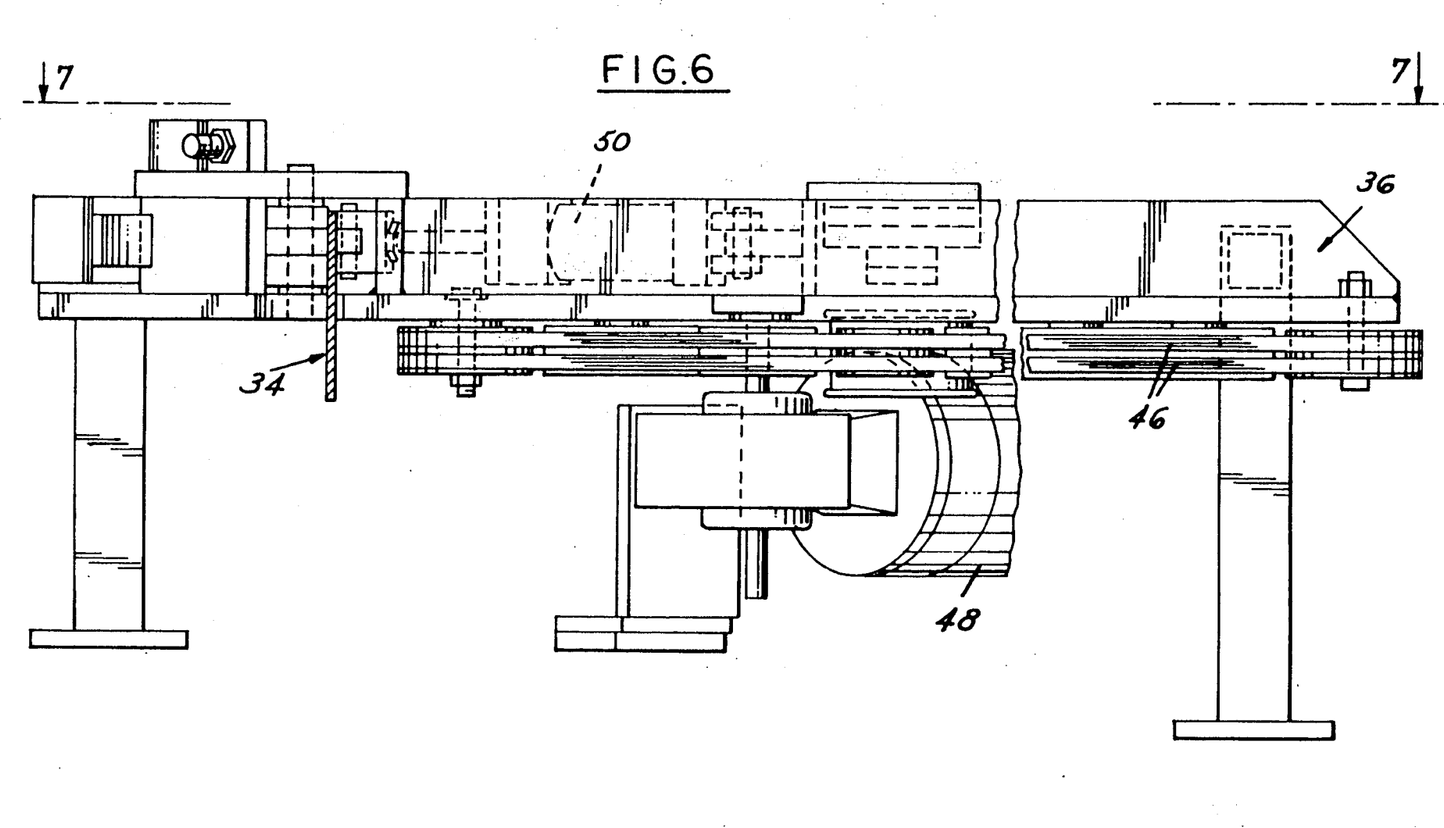
FIG. 6 is a view taken along the line 6—6 in FIG. 2.
Figure 7:
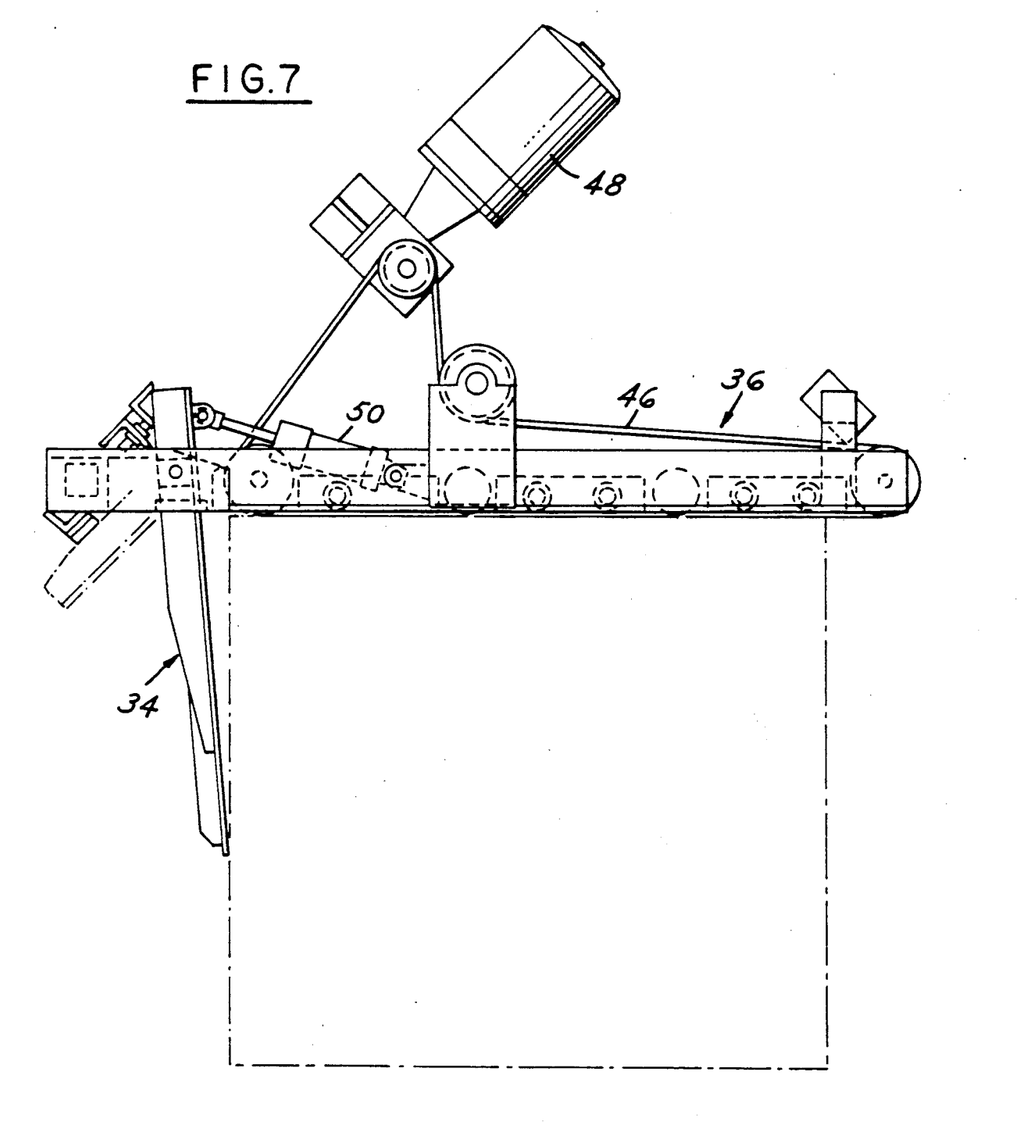
FIG. 7 is a view taken along the line 7—7 in FIG. 6.

Referring to FIGS. 3 and 5, the roller lift table 28 is supported on four legs 130 with a cam roller 100 mounted to the bottom of each leg 130. The cam rollers 100 rest on two draw bars 102, each with two cam surfaces 104. Each cam surface 104 consists of a ramp 108 with blending radii between two level planes 110, 112 to provide near sign wave vertical acceleration and deceleration when the draw bars are shifted. Each leg 130 is restrained by roller guide assemblies 115. Rollers 114 support the draw bars 102 and also support the vertical loads from the legs 130 transmitted by cam rollers 100. The draw bars 102 are connected to two crank arms 116 through two links 118. The crank arms 116 are tied together by a common shaft 120 supported by two pillow block bearings 122 and one flanged bearing 124. The draw bar cranks 116 are mounted on the outside of a pillow block bearing 122 in a cantilever fashion. Two other cranks 126, 128 are mounted between bearings; one 126 is connected to an air cylinder 54 and the other 128 connected to a cushioning device 132 to absorb energy at the ends of both up and down strokes. A compression spring 134 is mounted to two of the leg guide assemblies at the end of each draw bar 102 which are compressed at the end of the lifting stroke. These springs provide an additional force to overcome inertia when lowering the roller table 28 to provide a quicker response. The faster response time reduces the lead time for sensing when the articles are within the loading area.

Figure 4:
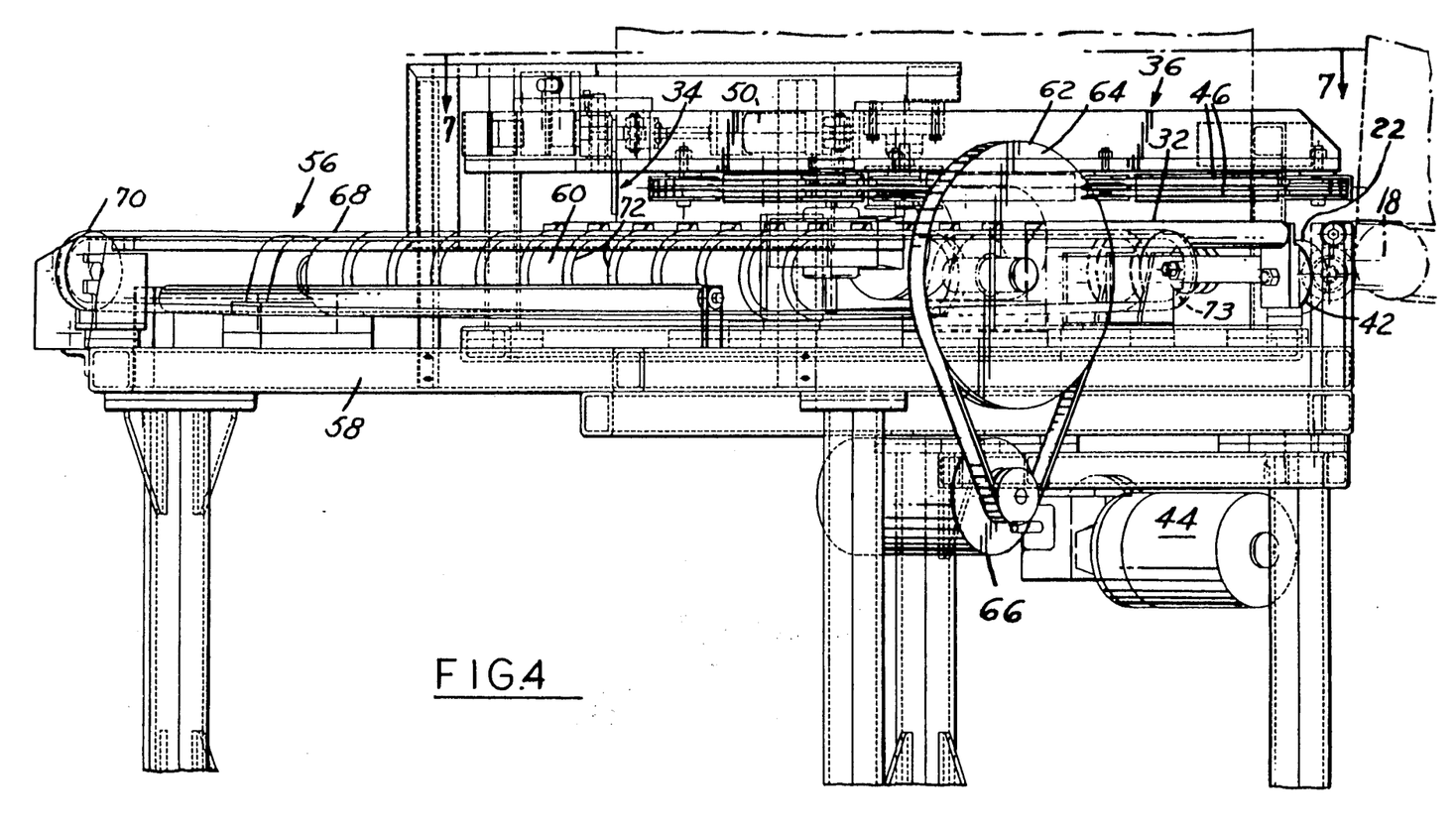
FIG. 4 is a front elevational view of the portion of the system taken along the line 4—4 in FIG. 2.

In operation, if station 26 is empty as indicated by unblocked photocell 78 an article is conveyed at indeterminate or unknown orientation by conveyor 22 past photocell 74 and onto rollers 32, which are initially in the upper position as illustrated in FIG. 4 of the drawings. If station 26 is occupied, photocell 78 will cause the article to stop conveyor 22 when the article blocks photocell 74. The article will continue to station 26 when photocell 78 becomes unblocked and conveyor 22 restarts. Rollers 32 convey the article firstly against belt driven side guide 36 and secondly convey against swing blade stop 34 as hereinabove described for orienting the article with respect to the feed direction. When the article is abutting the swing blade stop 34, photocell 78 is blocked, thereby indicating to feed motor control 90 that an article is present at the orientation station, so that if a second article blocks photocell 74 feed conveyor motor 24 is turned off. At the same time, presence of an article blocking photocell 78 arms valve drive electronics 92. When photocell 84 detects an empty space on conveyor 12, on which the article may be placed, valve drive electronics 92 energizes cylinder valves 94 and 96, so as to cause pneumatic cylinder 54 to lower rectangular frame 28, together with rollers 32; and cylinder 50 to swing stop blade 34 out of engagement with the article. The article held at orientation station 26 is engaged by belts 68, 72 of induction conveyor 56. It will be appreciated that the article remains in the orientation determined by belt drive side guide 36 and swing blade stop 34.

The article is then conveyed past photocell 82 and deposited on conveyor 12 at the location of tray 14 previously detected as empty by photocell 84. When the article passes photocell 82, indicating it is clear of rollers 32 on rectangular frame 28, valve drive electronics 92 will energize cylinder valves 94 and 96 so as to cause pneumatic cylinder 54 to return the rollers 32 to the raised position, and cause cylinder 50 to return swing blade stop 34 to the article arresting position. When the article passes photocell 78 indicating complete removal from orientation station 26 feeder motor control 90 re-energizes feed motor 24 of feeder conveyor 22, over-riding blocked photocell 74 which is holding another article for induction and conveying onto sortation conveyor 12.

Articles thus deposited on sorter conveyor 12 are conveyed downstream of the induction system and are subjected to electronic scanning of labels attached to the uppermost surface of said articles. It is recognized, therefore that preorientation pertains specifically to the induction process and is necessary because the trays on conveyor 12 are sized only slightly larger than the largest article for which the system is designed, and configured such that the shortest dimension of the rectangular shaped article is aligned with the direction of motion of sorter conveyor 12.

The state of the art is now such that downstream scanners will read "bar codes" in any visible position, which suggests that smaller articles do not require the critical prealignment as previously described. Consequently, an alternate method of operating this system for both large and small articles, which still effects the maximum volume of articles handled is described as follows:

The additional photocells MM and NN are added to the system which are connected to the valve drive electronics 92 as shown in FIG. 8. Photocell MM is located upstream of photocell 74 to detect the leading edge of substantially smaller article (which will fit on the tray of conveyor 12 in any position) and photocell NN is located even further upstream of photocell MM to define the lagging edge of a larger article. Thus, if photocell MM is blocked but not photocell NN the small article is detected, and conversely, if both photocells MM and NN are blocked a large article is detected.

The articles are conveyed as before. For large articles moving past and simultaneously blocking photocells MM and NN, there is no consequence to the valve drive electronics 92; and the article induction process is triggered by the blocking of photocell 78 and empty tray detector photocell 84. However, small articles, which block photocell MM and do not simultaneously block photocell NN, signal the valve drive electronics 92 to initiate the article induction process when an empty tray is detected by photocell 84, thus effectively bypassing photocell 78. Frame 28 together with rollers 32 can lower at any time prior to the article reaching orientation station 26, resulting in an unoriented small article being conveyed by induction belts 68 and 72 onto an empty tray of sorter conveyor 12. The remainder of the operating cycle is the same as previously described. The advantage of this method of operating the invention is the handling of both large and small articles without imposing unnecessary restrictive and excessively tight orientation parameters on all the articles prior to their placement on conveyor 12.

Figure 9:
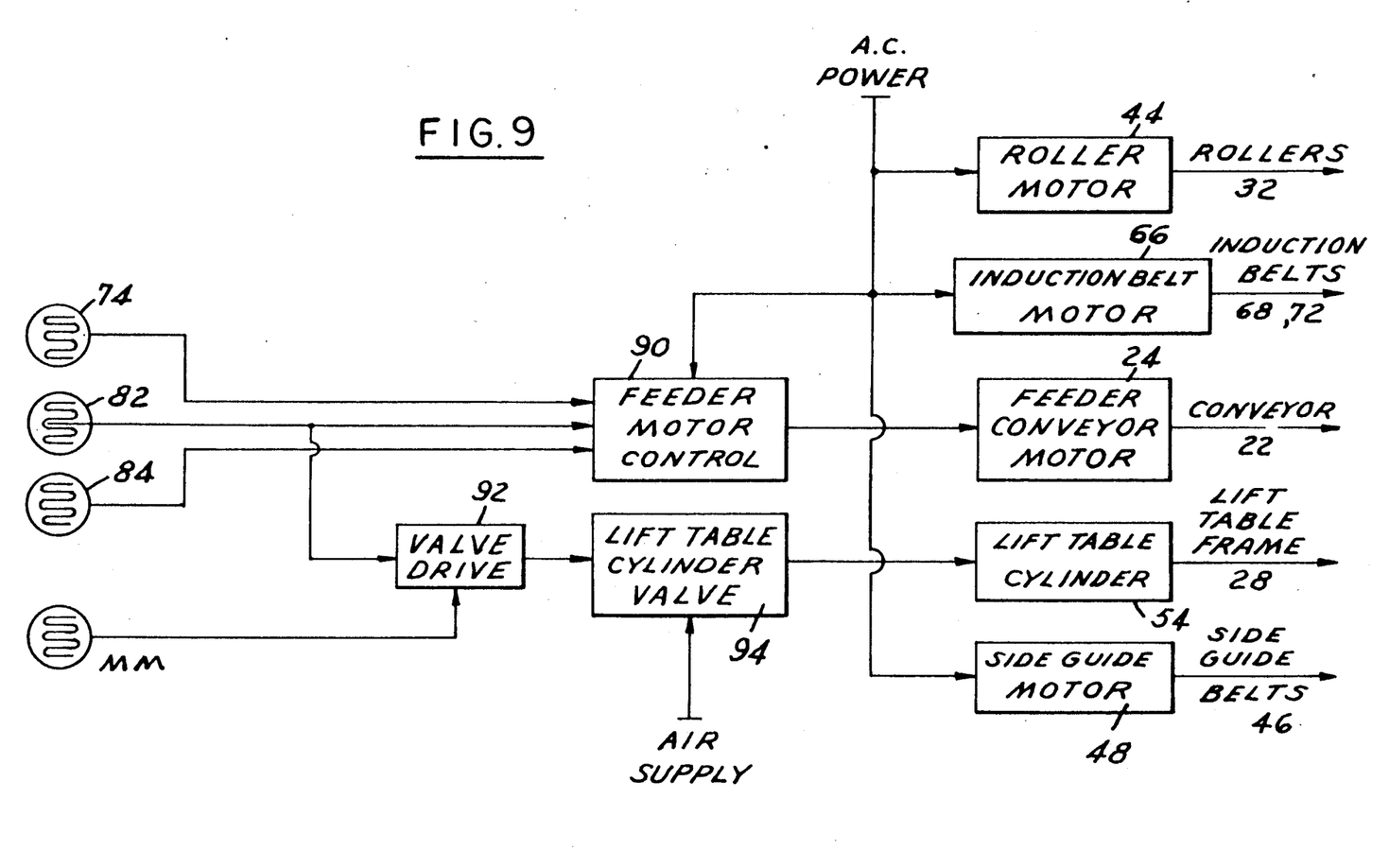
FIG. 9 is a functional block diagram of the electropneumatic control for the invention where preorientation of the articles is not an absolute necessity due to their small size relative to the sorter conveyor tray size.

Partially eliminating the orientation restrictions imposed on an array of sizes of articles as heretofore described leads to a mode whereby all the articles sorted may be substantially smaller than the sorter tray for which they are designed. In this case, orthogonal orientation is not of consequence, and this invention can then be operated in an alternate manner as shown in FIG. 9, as follows:

Swing blade stop 34 is made inoperable and fixed in the "open" position so as not to offer a restriction to articles carried by the lift table rollers 32 or induction belts 68 and 72. Photocells NN and 78 are not required. An unblocked photocell 82 will indicate the system is ready to receive an article from feeder conveyor 22. In operation, an article is carried at indeterminate and unknown orientation by conveyor 22 until it blocks photocell 74 which stops conveyor 22. When an empty tray is detected by photocell 84 conveyor 22 restarts, effectively bypassing photocell 74 and the article is conveyed onto rollers 32, which are initially in the raised position. Rollers 32 urge the article toward the side guide conveyor as heretofore described, until photocell MM is blocked. This causes the valve drive electronics 92 to lower the rollers 32, thus effectively initiating the induction process by placing the article on induction belts 68 and 72. The surface speed of all conveyors is designed to transmit the article through the controlling photocells in a manner that is coordinated and synchronized with the speed of the sorter conveyor 12, thus, as the article clears photocell 82, the rollers 32 return to the raised position, and feeder conveyor 22 restarts when another empty tray is detected by photocell 84, effectively overriding photocell 74. In this mode of operating is the elimination of all restrictions on orientation with the exception that the top surface of an article entering and leaving the induction system must remain as such, regardless of the method of operating the system.

It can thus be seen that there has been provided a sorter feeder system for automatically singulating, orienting, accelerating and conveying articles of essentially square and rectangular shape onto a slat or tray sorter conveyor in a configuration such that labels attached to the upper surface of said articles can be read by photo electric scanners which determine their destination. The sorter feeder system can be operated to maximize the volume of articles handled by orienting the articles on the trays or slats of the sorter conveyor with their shortest dimension parallel to the direction of travel of the sorter conveyor. This orientation permits a tray design which minimizes its length (with reference to direction of travel) and minimizes its required velocity relative to the volume of articles the sorter is required to handle. The sorter feeder system will maximize the volume of articles handled by the sorter conveyor by utilizing multiple units of the system to permit a series of slower feeding lines to fully load a single high speed sorter conveyor. For example, a single feeder system might transport articles onto every third empty tray of the sorter conveyor, and three feeder systems would fully load all the trays of the sorter conveyor. The sorter feeder system is flexible as to operation, so that depending on design requirements, articles of uniform size, either large or small with respect to the sorter conveyor tray size; or articles of assorted sizes, can be automatically transported to the sorter conveyor, regardless of the orientation in which they are received. Thus, both the relative sizes of the articles and tray, together with the assortment of sizes of articles conveyed, will determine the best of three (but not limited to) methods of operation proposed for this invention.

In one form, a combination of mechanisms orients various sized articles in a preferred orthogonal direction relative to the direction of travel of the sorter conveyor.

This combination consists of a continuously running series of rollers acting on the bottom surface of the article to urge said article against a continuously running belt driven side guide, acting on one side of the article, both together acting to urge the leading or front surface of the article against a swing blade stop. The orthogonal arrangement is such that the contact surface of the rollers constitute a plane parallel to the horizontal surface of the tray on the slat sorter; the contact surface of the belts on the side guide is vertical and transverse to the direction of travel of the tray; and the contact surface on the swing blade stop is vertical and in line with the direction of travel of the tray. Thus, the article is conveyed to, and held temporarily and stationary in a preferred orientation position by the forces of three mechanisms acting singularly and in combination, on three orthogonal surfaces of the article. It is recognized that the forces which urge the article along are frictional (not positive) and therefore do not require the electric motor driven mechanisms to be turned off, when the article ceases to move. This combination of mechanisms locates various sized articles received in a random order, frequency, and orientation, thereby defining the position from which they may be subsequently conveyed onto a moving tray in a precise and systematic manner. It is this predetermined position of the article which permits it to be identified with and therefore synchronized with the moving sorter conveyor tray. For example, the side of the article associated with the belt driven side guide mechanism, is also associated with the trailing end of the tray, and by referencing this surface, the trays are loaded, beginning at the trailing edge of said tray, and hence forward according to the size of the article conveyed. Thus, randomness is converted into orderliness.

The combination of mechanisms includes a lift table on which the rollers are mounted, together function to load the articles onto the multistrand induction belts, without imposing undesirable transverse loads on said belts. By lowering the articles (which often have non-uniform bottom surfaces encumbered by loose flaps, wrapping material, bands, and the like) onto the belts, all frictional and obstructive forces are induced in the longitudinal direction of the belts, for which they are designed. Therefore, undesirable forces, generated by a transversely moving article tending to run the belts out of their guiding grooves and driving pulleys, are eliminated.

The lift table on which the rollers are mounted and the multistrand induction belts, together function to change the direction of travel of the article without disturbing or changing the required orientation of the article.

Referring to FIGS. 9-13, a modified sorter feeder conveyor system 10a comprises a sorter conveyor 12a in the form of a continuously moving conveyor having a plurality of trays 14a spaced from each other longitudinally of the direction of motion and defining positions for receiving articles to be conveyed at predetermined desired orientation. Conveyor 12a may be either of the tilting-tray type or the slat-conveyor type, both of which are generally conventional in the art. A plurality of feed systems, specifically four feed systems 16a, 19a, 20a and 22a are spaced from each longitudinally of the direction of motion of conveyor 12a for feeding articles thereto intermittently and at desired orientation as a function of tray position. Feed system 16a will be described in greater detail in conjunction with the drawings, it being understood that systems 19a-22a are identical to system 16a.

Figure 13:
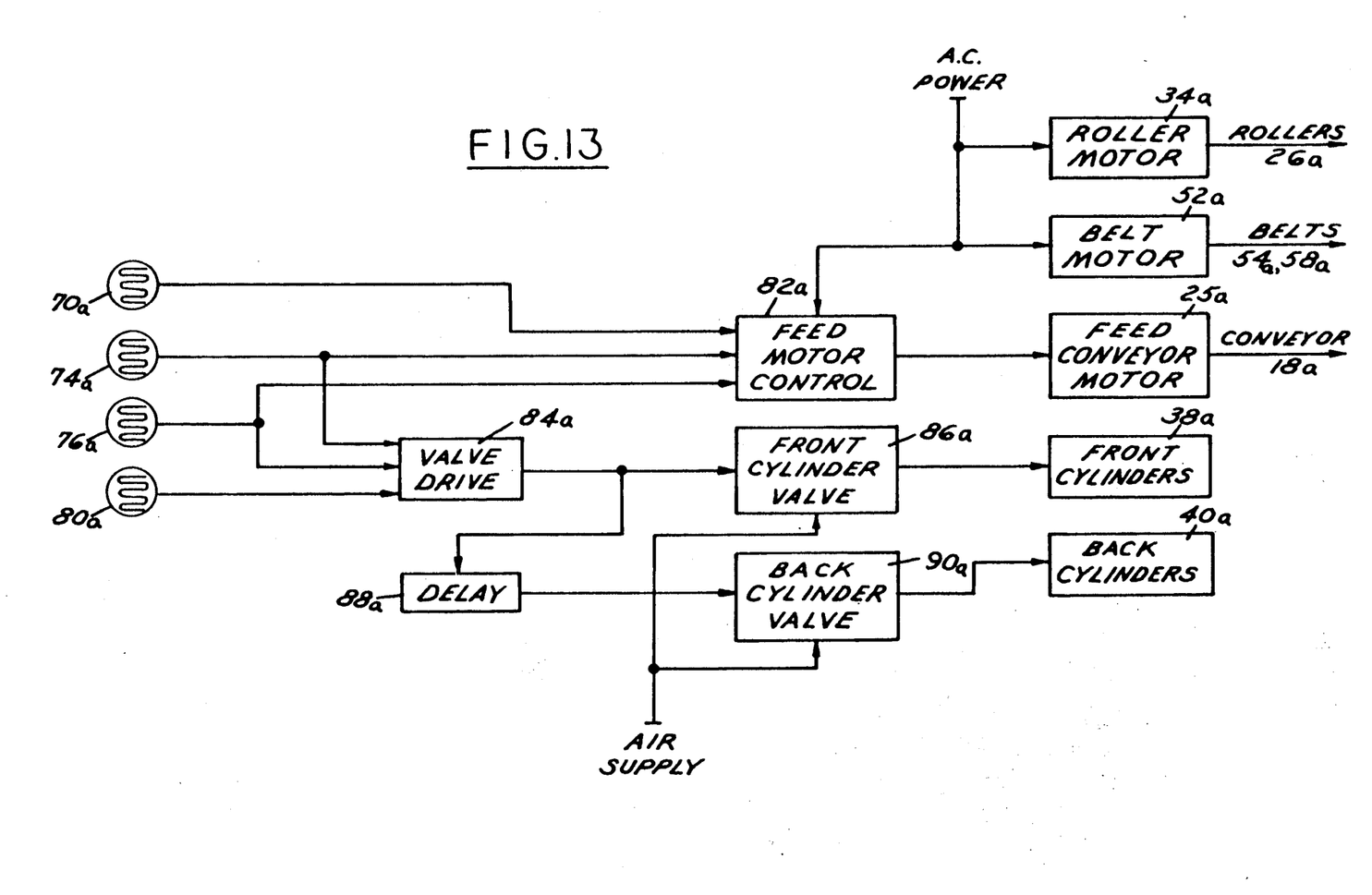
FIG. 13 is a functional block diagram of the electropneumatic control for the system of the present invention.

Feed systems 16a includes a feed conveyor 18a, such as a belt-type conveyor, coupled to an intermittently operated feed conveyor motor 25a (FIG. 13). An orientation station generally indicated at 23a is positioned between feed conveyor 18a and sorter conveyor 12a for receiving articles from conveyor 18a and orienting such articles in the select desired predetermined orientation for placement on conveyor 12a. Specifically, orientation station 23a includes a generally rectangular frame 24a having upstanding stanchions 28a rotatably supporting a multiplicity of rollers 26a at equally spaced parallel and coplanar axes of rotation. Stop plates 30a extend orthogonal sides of frame 24a, specifically the lower frame side and the frame side remote from feed conveyor 18a in the orientation of FIGS. 10 and 11. Rollers 26a are coupled by belts 32a through a drive shaft 33a to a continuously operable motor 34a. It will be noted in FIGS. 9 and 10 that the parallel axes of rotation of rollers 26a are at an angle, preferably 45°, to the direction of article feed from conveyor 18a. Motor 34a drives rollers 26a in a direction so as to urge articles conveyed to station 16a by conveyor 18a against stop plates 30a, such that the side surfaces of the article engage stop plates 30a and are urged thereagainst by rollers 26a. Thus, rollers 26a and stop plates 30a cooperate with each other so as to orient the articles at predetermined orientation with respect to the direction of feed from conveyor 18a. For rectangular articles as illustrated in phantom in FIG. 10, stop plates 30a are at orthogonal orientation. Frame 24a is supported above the workplace floor 36a by a forward array of pneumatic cylinders 38a and rearward or back arrays of cylinders 40a.

An intermediate conveyor 42a extends from orientation station 16a to sorter conveyor 12a. Intermediate conveyor 42a comprises a fixed frame 44a which supports a central drive roller 46a coupled by the pulley 48a and the drive belts 50a to the continuously operable drive motor 52a. A multiplicity of drive belts 54a extend from drive roller 46a around pulleys 56a adjacent to conveyor 12a. A second multiplicity of drive belts 58a extend from drive roller 46a rearwardly around pulleys 60a. Belts 54a, 58a are staggered laterally of conveyor 42a, as best seen in FIG. 2. Moreover, each pair of adjacent belts 58a are spaced laterally from each other by uniform separations which permit entry and free rotation of a roller 26a and supporting stanchions 28a therebetween. Drive belts 54a, 58a are parallel to the axes of rotation of rollers 26a. The upper planar article-support surface formed by rollers 26a is positioned above the planar support surface of belts 54a, 58a in the upper position of orientation frame assembly 24a illustrated in FIG. 3, but is below the planar support surface of belts 54a, 58a in the lower position of frame 24a (not shown). Conveyors 42a, 12a have identical velocities in the direction of motion of conveyor 12a.

Figure 10:
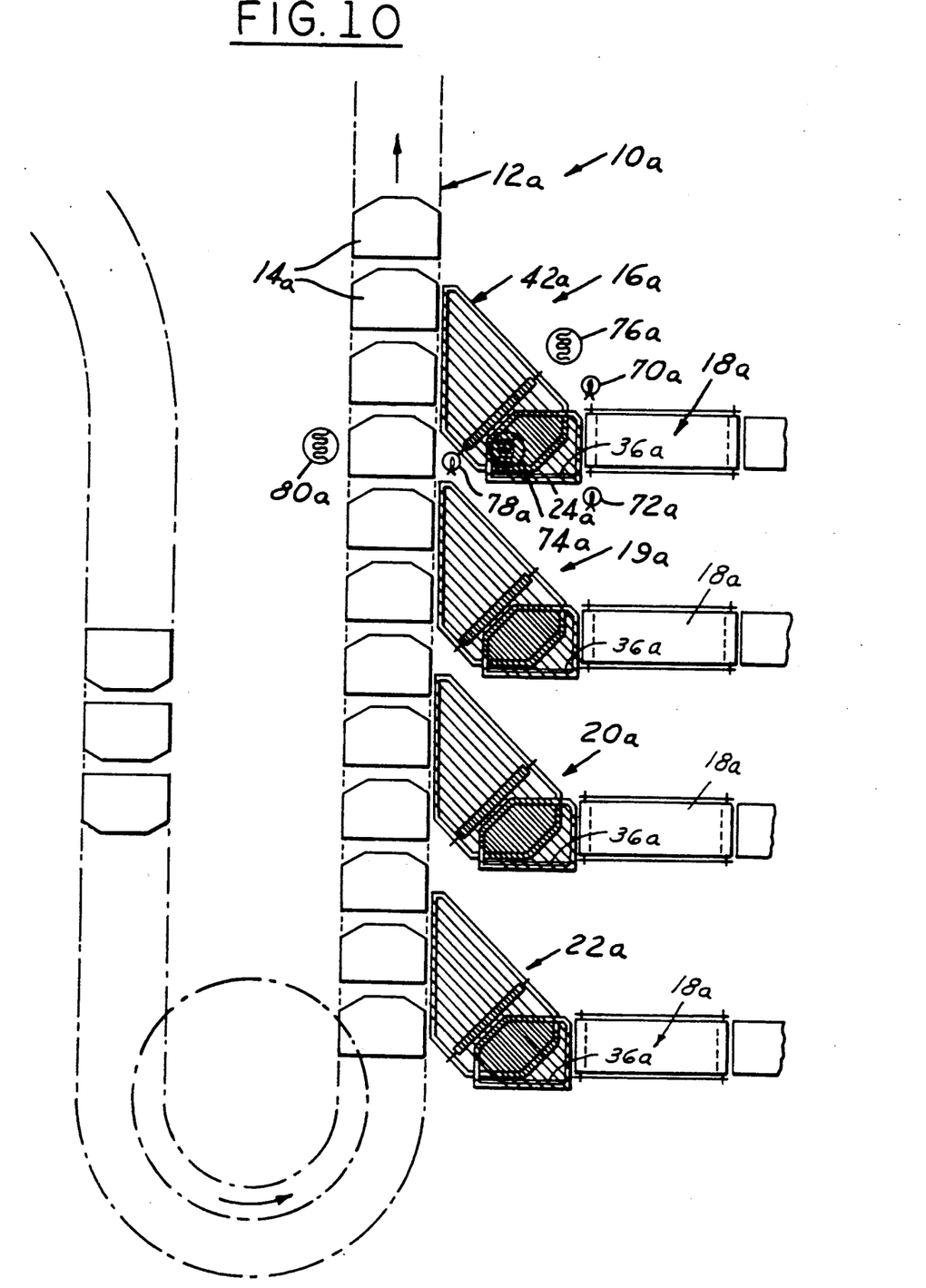
FIG. 10 is a partly diagrammatic view of a sorter feed system embodying the invention.
Figure 11:
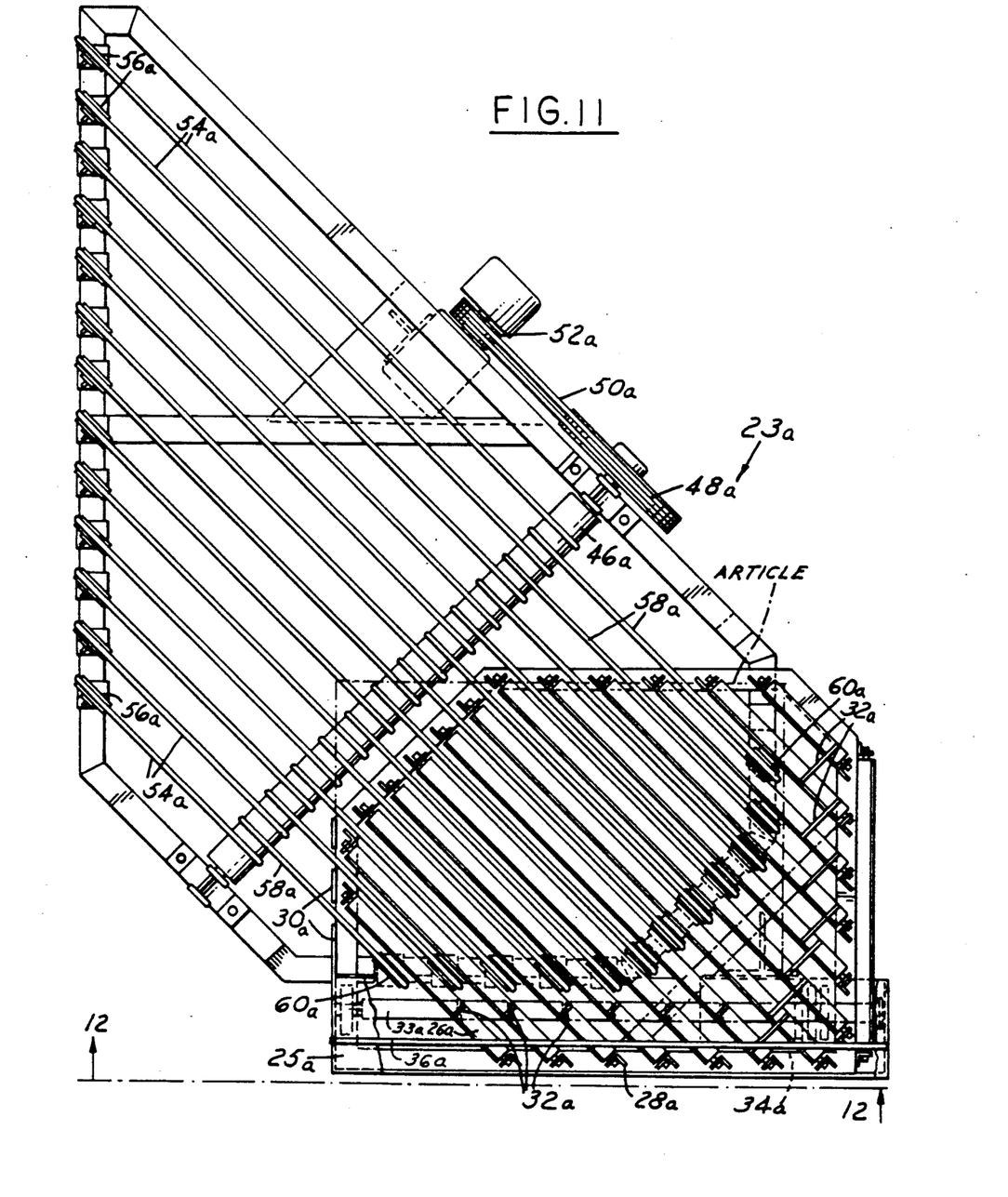
FIG. 11 is a plan view on an enlarged scale of a portion of the system shown in FIG. 10.
Figure 12:
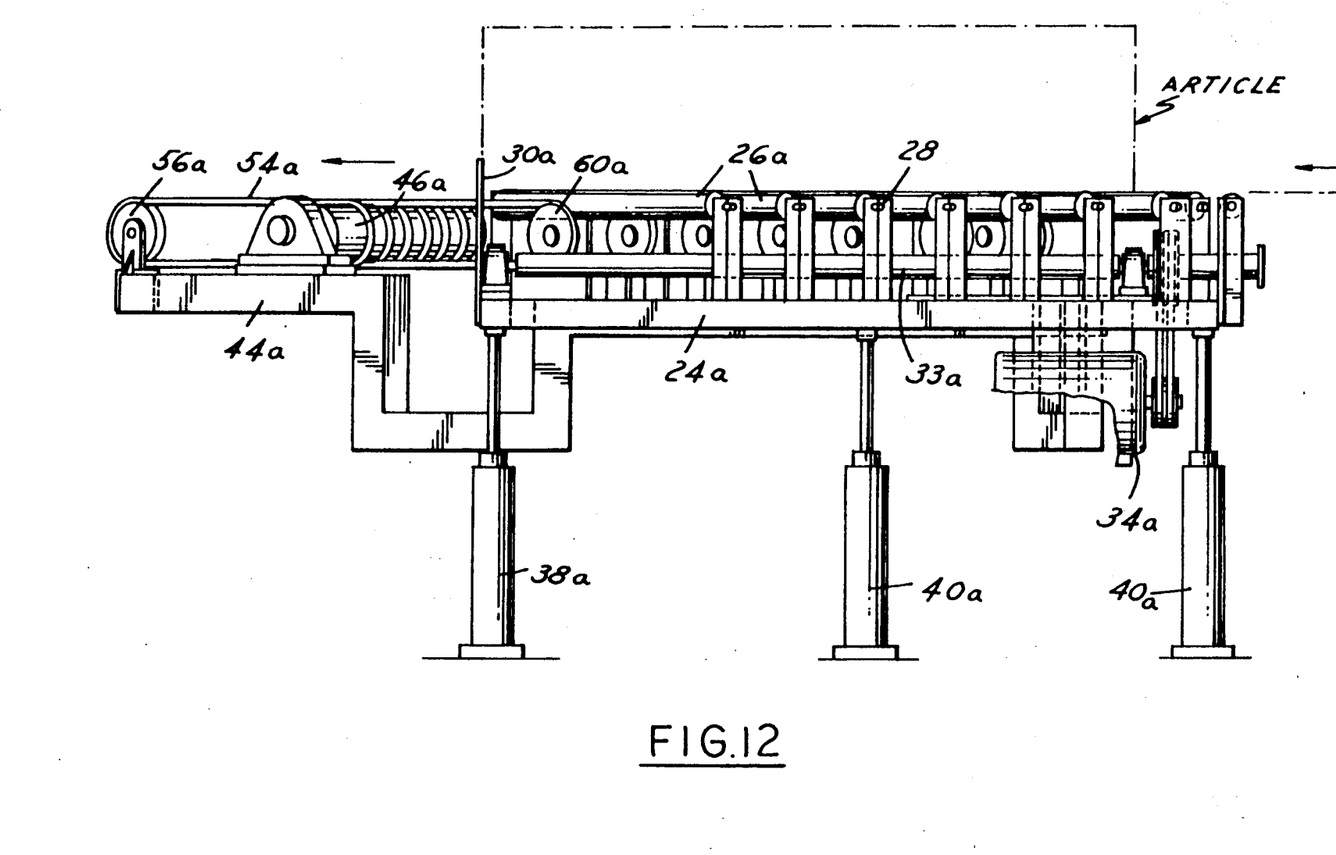
FIG. 12 is a front end view of the portion of the system taken along the line 12—12 in FIG. 11.

Article detection means are positioned at preselected locations for coordinating operation of the feeding system of the invention. Such presence detection means are illustrated as photocells in the drawings. Specifically, a first photocell 70a is positioned with respect to a lamp 72a so as to detect presence of an article at the forward end of feed conveyor 18a. A second photocell 74a is positioned on frame 24a so as to detect presence of an article in abutting engagement with stop plates 30a. A third photocell 76a is positioned with respect to a lamp 78a so as to detect passage of an article from orientation station 23a along intermediate conveyor 42a, and a further photocell 80a is located at preselected position so as to detect an empty location on conveyor 12a. Turning to FIG. 10, photocells 70a, 74a and 76a are coupled to a feed motor control 82a for selectively connecting ac power to feed conveyor motor 25a. Photocell 76a and 80a are connected to valve drive electronics 84a for providing valve drive signals to a front solenoid valve 86a coupled to front cylinders 38a (FIGS. 12 and 13). The valve drive signal to valve 86a is also fed through a delay 88a to a back or rear cylinder valve 90a for feeding air from a supply to back cylinders 40a.

In operation, an article is conveyed at indeterminate or unknown orientation by conveyor 18a past photocell 70a and onto rollers 26a, which are initially in the upper position illustrated in the drawings. Rollers 26a urge the article against the low friction side guide 36a toward stop plates 30a as hereinabove described for orienting the article at predetermined orientation with respect to the feed direction. When the article is abutting the stop plates, photocell 74a is blocked, thereby indicating to feed motor control 82a that an article is present at the orientation station, so that feed conveyor motor 25a is turned off. At the same time, presence of an article blocking photocell 74a arms valve drive electronics 84a. When photocell 80a detects an empty space on conveyor 12a at which the article may be placed, valve drive electronics 84a energize front cylinder valve 86a so as to lower front cylinders 38a. The article held at orientation station 22a is thus tipped so that the forward edge is engaged by belts 54a, 58a of intermediate conveyor 42a. After a preset delay 88a, rear cylinder valve 90a is energized and rear cylinders 40a are also lowered so that the article is completely supported by belts 54a, 58a. It will be appreciated, however, that the article remains in the orientation determined by side guide 36a and stop plates 30a. The article is then conveyed past photocell 76a and deposited on conveyor 12a at the location or tray 14a detected as empty by photocell 80a. When the article passes photocell 76a, indicating complete removal from orientation station 22a, feed motor control 82a re-energizes feed motor 20a and cylinders 38a, 40a are returned to the upper positions illustrated in FIG. 11.

In operation, an article is conveyed at indeterminate or unknown orientation by conveyor 18a past photocell 70a and onto rollers 26a, which are initially in the upper position illustrated in the drawings. Rollers 26a urge the article against stop plates 30a as hereinabove described for orienting the article at predetermined orientation with respect to the feed direction. When the article is abutting the stop plates, photocell 74a is blocked, thereby indicating to feed motor control 82a that an article is present at the orientation station, so that feed conveyor motor 25a is turned off. At the same time, presence of an article blocking photocell 74a arms valve drive electronics 84a. When photocell 80a detects an empty space on conveyor 12a (FIG. 10) at which the article may be placed, valve drive electronics 84a (FIG. 11) energize front cylinder valve 86a so as to lower front cylinder 38a. The article held at orientation station 22a is thus tipped so that the forward edge is engaged by belts 54a, 58a of intermediate conveyor 42a. After a preset delay 88a, rear cylinder valve 90a is energized and rear cylinders 40a are also lowered so that the article is completely supported by belts 54a, 58a (FIG. 13). It will be appreciated, however, that the article remains in the orientation determined by side guide 36a and stop plates 30a. The article is then conveyed past photocell 76a and deposited on conveyor 12a at the location or tray 14a detected as empty by photocell 80a. When the article passes photocell 76a, indicating complete removal from orientation station 22a, feed motor control 82a re-energizes feed motor 20a and cylinders 38a, 40a are returned to the upper positions illustrated in FIG. 12.

We claim:

1. A sorter feeder system for automatically singulating, orienting, accelerating and conveying articles of essentially square or rectangular shape comprising
    a continuously moving slat or tray sorter conveyor,
    at least one feed system positioned along a portion of the path of the sorter conveyor,
    said feed system including an intermittently operated feeder conveyor tending to move articles in a direction generally perpendicular to the sorter conveyor,
    a roller conveyor tending to move an article at an angle to the direction of movement by the feeder conveyor and rearwardly of the direction of the sorter conveyor,
    means for moving the roller conveyor vertically,
    a continuously operating induction conveyor having a portion extending transversely with respect to the roller conveyor and generally at an acute angle relative to the direction of movement of the sorter conveyor such that when the roller conveyor is lowered, an article thereon is moved by said induction conveyor to a position adjacent the sorter conveyor,
    a side guide provided in overlying relationship to the roller conveyor and defining a vertical surface intersecting the axes of the roller conveyor,
    a swinging blade stop provided generally perpendicular to the feeder conveyor and in overlying relationship to the roller conveyor, such that the contact surface of the roller conveyor constitutes a plane parallel to the horizontal surface of the trays or slats on the sorter conveyor, the contact surface of the side guide being vertical and transverse to the direction of travel of the tray or slats, and the contact surface on the swing blade stop being vertical and in line with the direction of travel of the tray or slat so that the article is conveyed to, and held temporarily and stationary in a preferred orientation position by the forces of the roller conveyor, side guide and blade stop acting singularly and in combination on the three orthogonal surfaces of the article.

2. The sorter feeder system set forth in claim 1 wherein said side guide comprises a continuous running belt driven side guide.

3. The sorter feeder system set forth in claim 2 wherein said sorter conveyor and feeder conveyor are driven at the same speed with respect to the direction of travel of the sorter conveyor.

4. The sorter feeder system set forth in claim 2 wherein said induction conveyor has its longitudinal axis at an angle to the sorter conveyor.

5. The sorter feeder system set forth in claim 4 wherein said angle is about 45°.

6. The sorter feeder system set forth in claim 2 wherein said induction conveyor comprises a plurality of transversely spaced endless belts positioned horizontally between the rollers.

7. The sorter feeder system set forth in claim 6 wherein said induction conveyor includes a transverse drive roller over which said first mentioned endless belts are trained and a second set of endless belts trained over said drive roller and extending to a position alongside said sorter conveyor.

8. The sorter feeder system set forth in claim 2 including means for sensing the presence of an article on the feeder conveyor and means for stopping the movement of the feeder conveyor in response to presence of an article on the feeder conveyor.

9. The sorter feeder system set forth in claim 2 including means responsive to the presence of an article on the feeder conveyor and means responsive to an empty place on the sorter conveyor for causing the roller conveyor to be moved downwardly and deliver the article on the roller conveyor in timed relation to the sorter conveyor.

10. The sorter conveyor system set forth in claim 2 including
   first means for sensing the presence of an article on the feeder conveyor,
   second means for sensing the presence of an article in abutment with the blade stop,
   third means for sensing the passage of an article from the induction conveyor,
   fourth means for sensing the absence of an article on a preselected position on the sorter conveyor, and
   electronic means responsive to the presence of an article at the blade stop and the absence of an article in the preselected position on the conveyor to lower the roller conveyor and move the blade stop to release the article such that the induction conveyor delivers the article to the sorter conveyor.

11. The sorter conveyor system set forth in claim 2 wherein said feed system includes anti-tipping skids adjacent the trailing end of the induction conveyor and positioned to engage an article when the roller conveyor is lowered to prevent tipping due to acceleration forces applied to the bottom surface of the article by the induction conveyor.

12. The sorter conveyor system set forth in claim 2 wherein said blade stop is positioned relative to the side guide at an angle slightly less than 90° to urge an article toward the side guide and absorb the energy of an article.

13. The sorter feeder system set forth in claim 1 wherein said sorter conveyor and feeder conveyor are driven at the same speed with respect to the direction of travel of the sorter conveyor.

14. The sorter feeder system set forth in claim 1 wherein said induction conveyor has its longitudinal axis at an angle to the sorter conveyor.

15. The sorter feeder system set forth in claim 14 wherein said angle is about 45°.

16. The sorter feeder system set forth in claim 1 wherein said induction conveyor comprises a plurality of transversely spaced endless belts positioned horizontally between the rollers.

17. The sorter feeder system set forth in claim 16 wherein said induction conveyor includes a transverse drive roller over which said first mentioned endless belts are trained and a second set of endless belts trained over said drive roller and extending to a position along side said sorter conveyor.

18. The sorter feeder system set forth in claim 1 including means for sensing the presence of an article on the feeder conveyor and means for stopping the movement of the feeer conveyor in response to presence of an article on the feeder conveyor.

19. The sorter feeder system set forth in claim 1 including means for sensing the presence of an article on the feeder conveyor and means responsive to an empty place on the sorter conveyor for causing the roller conveyor to be moved downwardly and deliver the article on the roller conveyor in timed relation to the sorter conveyor.

20. The sorter feeder system set forth in claim 1 including means for successively lowering the leading end and the trailing end of the roller conveyor.

21. A system for automatically feeding articles at predetermined orientation to a continuously moving sorter conveyor comprising
   a feeder conveyor for delivering articles at indeterminate orientation,
   an orientation station positioned adjacent to said feed conveyor for receiving articles therefrom at a predetermined direction, said orientation station including stop means, said stop means comprising surfaces oriented at slightly less than 90° for engaging side surfaces of an article and means for urging an article received at said orientation station against said two surfaces of said stop means at an angle to said predetermined direction such that the article is positioned by said stop means at predetermined orientation with respect to said direction, and
   an intermediate conveyor movable vertically for selectively receiving an article from said station and conveying the article to said sorter conveyor while maintaining said predetermined orientation.

22. The system set forth in claim 21 including means responsive to the presence of an article on the feeder conveyor and means responsive to an empty place on the sorter conveyor for causing the intermediate conveyor to be moved downwardly and deliver the article on the intermediate conveyor in timed relation to the sorter conveyor.

23. The system set forth in claim 21 including
   first means for sensing the presence of an article on the feeder conveyor,
   second means for sensing the presence of an article in abutment with the stop means,
   third means for sensing the passage of an article from the orientation station,
   fourth means for sensing the absence of an article on a preselected position on the sorter conveyor, and
   electronic means responsive to the presence of an article at the blade stop and the absence of an article in the preselected position on the conveyor to lower the intermediate conveyor and move the stop means to release the article such that the induction conveyor delivers the article to the sorter conveyor.

* * * * *